United States Patent [19]
Ibar

[11] Patent Number: 5,280,883
[45] Date of Patent: Jan. 25, 1994

[54] INSTALLATION FOR CUTTING SCRAP IRON BY OXYGEN CUTTING

[75] Inventor: Jean-Henri Ibar, Saint Pol Sur Mer, France

[73] Assignee: Solomat S.A., Saint Pol Sur Mer, France

[21] Appl. No.: 21,877

[22] Filed: Feb. 24, 1993

[30] Foreign Application Priority Data

Mar. 7, 1992 [FR] France .................. 92 08217

[51] Int. Cl.⁵ .............................................. B23K 7/08
[52] U.S. Cl. ........................................ 266/49; 266/48
[58] Field of Search ................ 266/48, 49, 51, 50, 266/77

[56] References Cited

U.S. PATENT DOCUMENTS 2,693,749  11/1954  Houdek .................................. 98/115
4,441,934  4/1984  Kawakami ......................... 148/9 R

FOREIGN PATENT DOCUMENTS 0051250  5/1982  European Pat. Off. .
0142521  7/1980  Fed. Rep. of Germany ........ 266/49
0103962  6/1983  Japan .................................... 266/49
0713663  2/1980  U.S.S.R. ............................... 266/49

Primary Examiner—Scott Kastler
Attorney, Agent, or Firm—Baker & Daniels

[57] ABSTRACT

Installation for cutting scrap iron by oxygen cutting, characterised in that it furthermore comprises a pit in the form of a channel filled with water disposed beneath the cutting bench, which cutting bench comprises holes in order to allow cutting slag to fall directly into the water in the pit, and in that the cutting zone, in particular the torches thereof, is completely housed inside a large leaktight container internally provided with at least one suction hood for evacuating the vapors, brown smoke and dust emitted during the cutting operation.

The installation is connected to a unit for treating the smoke, for dust removal and for denitrification.

15 Claims, 6 Drawing Sheets

INSTALLATION FOR CUTTING SCRAP IRON BY OXYGEN CUTTING

The subject of the invention is an installation for cutting scrap iron by oxygen cutting comprising a cutting bench for placing thereon the scrap metal to be cut, a torch-carrier support provided with means for carrying a plurality of torches situated above the scrap metal to be cut, the support being movable on rails disposed parallel to the cutting bench in order to move the torches as the cutting progresses.

The cutting of scrap iron is currently used in the iron and steel industry for cutting scrap iron of varying origin intended to be recycled after being formed to a size suitable to be handled; amongst the scrap iron to be cut are found in particular slabs, salamander, sheet metal, windings and other scrap metal of large dimensions.

Oxygen cutting is a known process for sectioning metals by localized and continuous combustion due to the action of a jet of pure oxygen acting on a point previously brought to a suitable temperature (initiation temperature); in order to do this, a cutting torch having a cutting head provided with cutting orifices and several heating orifices is used; through the heating orifices it is possible to convey for example natural gas intended to bring the initiation point to the appropriate temperature (1300°) and to maintain this temperature on the edge of the kerf throughout the time needed for the oxygen cutting operation; highly pure oxygen, of the order of 99.5% or more, is conveyed through the cutting orifice in order to produce the combustion in the narrow kerf through the thickness of the metal; the oxidation of the iron thus becomes quasi-instantaneous, and, since the reaction is highly exothermic, the heat released heats the neighbouring zones, thus promoting step-by-step attack. For certain applications, it is possible to replace the heating natural gas by acetylene, tetrene or propane.

The recovery of scrap iron in general, and the oxygen cutting operations in particular, are not "clean" operations. In fact, on the one hand, combustion waste is produced, for example slag accompanied by various dusts, on the other hand, there is a strong production of vapours and of smoke in particular brown smoke in the form of nitrogen oxide $NO_x$, in particular $NO_2$ and also $SO_3$ and HCl. In current cutting installations, most of the operations are performed manually and especially in free air; by virtue of this fact, it may be said that these known installations have the drawback of being relatively polluting and dangerous.

The aim of the present invention is to overcome these drawbacks.

According to the present invention, an installation for cutting scrap iron by oxygen cutting comprising a cutting bench for placing thereon the scrap metal to be cut, a torch-carrier support provided with means for carrying a plurality of torches situated above the scrap metal to be cut, the support being movable on rails disposed parallel to the cutting bench in order to move the torches as the cutting progresses, is particularly noteworthy in that it furthermore comprises a pit in the form of a channel filled with water disposed beneath the cutting bench, which cutting bench comprises holes in order to allow cutting slag to fall directly into the water in the pit, and in that the cutting zone, in particular the torches thereof, is completely housed inside a large leaktight container internally provided with at least one suction hood for evacuating the vapours, brown smoke and dust emitted during the cutting operation. Thus, on the one hand, a granulation and the extinguishing of the cutting spatters at the moment when they fall into the water is obtained, and on the other hand, the various smokes and dusts emitted during the cutting operation are evacuated by the suction hood. Obviously, the smoke evacuated by the suction hood in entrained through an exit conduit towards a treatment unit which advantageously comprises a dust removal unit provided with filters and a denitrification unit using an injection of slaked lime; thus, it is possible no longer to pollute the air, by controlling the atmospheric emissions, so that they comply with anti-pollution directives and instructions, by virtue of a treatment unit which is specially dimensioned for such a cutting installation using oxygen cutting.

Preferentially, the cutting bench comprising holes consists of flat steel sections placed edgewise and slantwise between blocks provided for this purpose over the longitudinal perimeter of the pit.

Advantageously, the means provided in the support for carrying the torch-carrier are arranged so that the torch-carrier can move with respect to the support/ on the one hand, in a direction which is transverse to the cutting bench, and, on the other hand, in a vertical direction so that the torch-carrier can move in all three axes with respect to the scrap iron to be cut. In fact, on the one hand, the movement of the support parallel to the cutting bench and the two movements of the torch-carrier with respect to the support, allow the movement of the torch-carrier along all three axes with respect to the scrap metal to be cut; since these operations are obviously motorised, it becomes possible to automate the cutting of the scrap metal both in the longitudinal direction and in the direction which is transverse to the cutting bench. For this purpose, the torches are disposed aligned with respect to each other, this alignment being provided rotatable through 90° around a vertical axis in order to dispose the torches either parallel, or perpendicularly to the cutting bench. For example, provision may be made to install ten torches with a spacing between each of them varying from 100 mm to 500 mm, thus, with motorisation of all these movements, it will be possible to automate their control and therefore to eliminate the manual cutting operations.

According to a preferred embodiment, an installation for cutting scrap iron by oxygen cutting according to the invention is particularly noteworthy in that the large leaktight container is connected to the support and can therefore move with it as well as the suction hood with its exit conduit, which conduit has, at its end, a shuttle-shaped section which is elongated in the direction of the cutting bench in order to be able to be housed between the flexible lips of an suction sheath which is fixed with respect to the cutting bench and of longitudinal shape parallel to the cutting bench, so that the flexible lips are constantly pressed by the suction either against each other, or onto the sides of the shuttle as the support moves, the suction sheath leading into the treatment unit for dust removal and denitrification. Thus, a constantly leaktight join between the moving support and the treatment unit which is fixed is ensured with a relatively simple, economical and easy to maintain means; this would not have been possible for example with flexible pipework fixed at each end to the two elements which can move with respect to each other because the travel of the support is of necessity fairly large.

Advantageously, the leaktight container furthermore comprises flexible lips disposed on these two vertical sides perpendicular to the cutting bench and arranged so as to ensure the leaktightness of the container while allowing the support to pass above the scrap iron to be cut; thus, the leaktight container covers the cutting zone and its leaktightness downwards is ensured by the flexible lips which remain permanently in contact with either the cutting bench, or the scrap metal which is found thereon; the leaktight container thus provides leaktightness upwards and on the sides while it is obviously the surface of the water of the cutting bench which ensures the leaktightness downwards.

Preferably, the leaktight container comprises at least two suction hoods, namely, on the one hand, a hood of conventional type disposed above the cutting zone and whose suction is exerted vertically upwards, on the other hand, a suction hood having a longitudinal opening disposed horizontally and parallel to the cutting bench and at the height of the latter, and whose suction is exerted horizontally in a direction perpendicular to the cutting bench. Each hood may be provided with its own exit conduit, each conduit having an individual dimension, which is adapted to the desired evacuation capacity. In practice, it has been noted that it is possible, with the horizontal suction, to draw off 80% of the smoke emitted and there then remains only a residue of 20% to be collected by the hood of conventional type, which is of necessity disposed quite far from the zone of emission of the smoke because of the presence of the torches.

According to a preferred embodiment, in the pit, partially submerged beneath the flat steel sections, lateral supporting members are provided disposed transversely in order to channel the suction which is exerted horizontally.

Since the installation for cutting scrap iron by oxygen cutting is principally intended for cutting slabs, it is particularly advantageous for the cutting bench to be long enough for at least two slabs to be disposed thereon; thus, during the operation of oxygen cutting a slab, it is possible to handle the other either to position it with a view to its subsequent cutting, or to remove the small pieces which result from the preceding cutting. By virtue of this fact, the operations of oxygen cutting and handling can follow each other without any idle time, which leads to fast recovery of the investment costs of the equipment.

For cutting windings, or coils, it is possible to envisage providing a torch-carrier specially arranged in order to carry four torches, which are driven in a so-called cross movement; in this case, it is even possible to provide a second support in order to install therein this particular torch-carrier and it is then expedient to extend the length of the cutting bench with its attached equipment such that one and the same treatment unit for dust removal and denitrification may be used by both supports.

BRIEF DESCRIPTION OF THE DRAWINGS

The present invention comprises further advantages which will be clearly understood in the light of the description of a non-limiting example of embodiment which is illustrated by the attached drawings.

FIG. 1 with its various views: 1a from the front, 1b from the top and 1c in profile represents an overall view of an installation for cutting scrap iron by oxygen cutting according to the invention; this installation comprises a cutting bench 1 on which the scrap iron 10 to be cut is deposited, and cutting torches (not visible in FIG. 1) housed within a leaktight container 5; a conduit 6 leaves the leaktight chamber 5, which conduit is connected to a suction sheath 7 by means of a shuttle 61, the suction sheath 7 leads to a treatment unit 8 for dust removal and denitrification, a pit 4 in the form of a channel filled with water is made in the cutting bench 1; the torches are held by a support 21 which is rigidly attached to the leaktight container 5, the support 2 can move on rails 3 disposed parallel to the cutting bench in order to move the support, and therefore the torches, longitudinally along the cutting bench.

FIG. 2 is an enlarged view of FIG. 1c on which there are represented the pit 4 filled with water, the cutting bench 1 on which a slab 10 is disposed, and the leaktight container 5; the leaktight container 5 widely covers the cutting zone and it is provided on its sides perpendicular to the cutting bench with flexible lips 51 to ensure the leaktightness around the scrap iron 10 disposed on the cutting bench 1; inside the container 5 there are housed two suction hoods 90, 91; the suction hood 90 is a hood of conventional type disposed above the cutting zone and whose suction is exerted vertically upwards; the suction hood 90 is connected to the suction sheath 7 provided with flexible lips 71 by means of a suction conduit 6; the second suction hood 91 comprises a longitudinal opening disposed horizontally and parallel to the cutting bench and at the height of the latter, its suction is exerted horizontally in a direction perpendicular to the cutting bench; the suction hood 91 is connected to the suction sheath 7' provided with flexible lips 71' by means of a conduit 6'; it is clear that the suction sheaths 7 and 7' may in fact only be one and the same sheath, just as the conduits 6 and 6' may be merged at least until they arrive at the container 5; at this point, it is desirable for the sections of the conduits to be adaptable, and even adjustable on demand, in order to be better adapted to the suction rate of each hood; it has been noticed that in practice it was preferable for the suction to be performed in the ratio 80/20, that is to say that the suction hood 91 is four times more powerful than the suction hood 90.

FIG. 3 is a section of the conduit 6 and of the suction sheath 7 at the shuttle 61; FIGS. 4a and 4b are sections of FIG. 3 respectively along the lines A—A and B—B; the cut line C—C corresponding to the section in FIG. 3 is represented in FIGS. 4a and 4b; the elongate shape of the shuttle 61 which constitutes the end of the conduit 6 is clearly seen in FIG. 3, the shuttle 61 is introduced between the flexible lips 71 of the sheath 7 so that it can move longitudinally along the cutting bench while retaining leaktightness since the suction which exists in the sheath 7 ensures that the flexible lips 71 are constantly pressed against the shuttle 61; this is also seen in FIG. 4b, that is to say the section B—B in FIG. 3, in which the suction sheath 7 is seen with its flexible lips 71 pressed against the shuttle 61 which constitutes the end of the conduit 6; in FIG. 4a, section A—A in FIG. 3, the suction sheath 7 is seen at a location which is not opposite a conduit 6, in this case, the flexible lips 71 are simply pressed in a leaktight manner against each other, again by virtue of the suction.

FIG. 5 represents an installation for cutting scrap iron by oxygen cutting which is more spread out than that previously described in particular in FIG. 1b, which is just the same as the left part in FIG. 5; in fact, FIG. 5 is a simple doubling of the cutting installation in FIG. 1b with the cutting bench 1, 1', two leaktight containers 5, 5', two sheaths 7, 7'' disposed in extension to each other and possibly two treatment units 8, 8' for dust removal and denitrification; it is possible to provide a valve 79 in order to connect or disconnect, on demand, one and/or the other of the sheaths 7, 7'' to one and/or the other of the treatment units 8, 8'; on the cutting bench 1, 1', there are represented a slab 10, a piece of salamander 11 and a winding 12 as examples of scrap iron to be cut; the support 5' may comprise torches specially disposed for cutting the windings 12 in a cross; similarly, the support 5 may be dedicated to cutting slabs 10 and the cutting bench 1 may be made sufficiently long so that, during the cutting of one slab on a first half of the bench 1, it is possible to perform the handling operations on a slab on the other half of the bench 1; the view of the support 5 in FIG. 5 may be considered as a top view of the container in FIG. 2, thus the arrangement of the horizontal suction hoods 91, 91' may be seen more clearly.

FIG. 6 represents what can be done with such an installation, for example with a torch-carrier head provided with ten torches c1 to c10; if a slab is cut transversely, ten slab segments are simultaneously obtained; whereas if it is cut longitudinally, up to eleven segments may be obtained; in order to do this, assuming that the slab is always disposed longitudinally on the cutting bench 1, provision is made to rotate the torch-carrier by 90° around a vertical axis; provision is also made, in order to be able to adapt to the various dimensions of the slabs, to be able to change, on demand, the spacing of the torches with respect to each other; with the same aim, the torch-carrier is provided so as to be movable in the vertical direction in order to be able to move close to or away from the slabs to be cut; obviously, for transverse cutting, the carriage-holder is also provided so as to be movable transversely with respect to the cutting bench; thus the torch-carrier carriage can move in all three axes; in order to obtain this mobility, motorisation units with gear reduction, spherical bearing rollers, guide cam rollers, and ball screws which are dust-proof are provided so that all these elements can be remote-controlled and even programmed by means of an electrical cabinet placed inside a cabin protected against bad weather and a control console available to an operator.

Figure 1C:
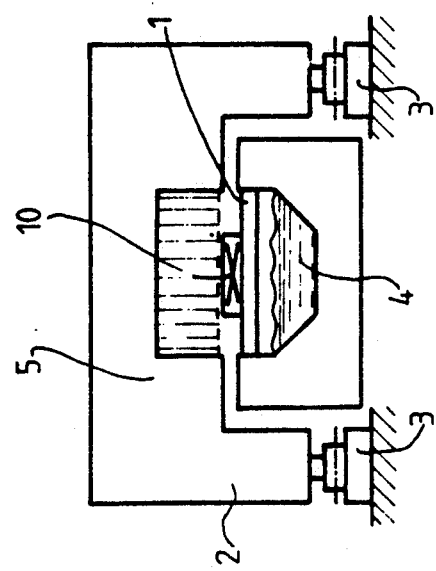
FIGS. 1a, 1b, 1c are respectively front, top and profile views of a cutting installation according to the invention.
Figure 1A:
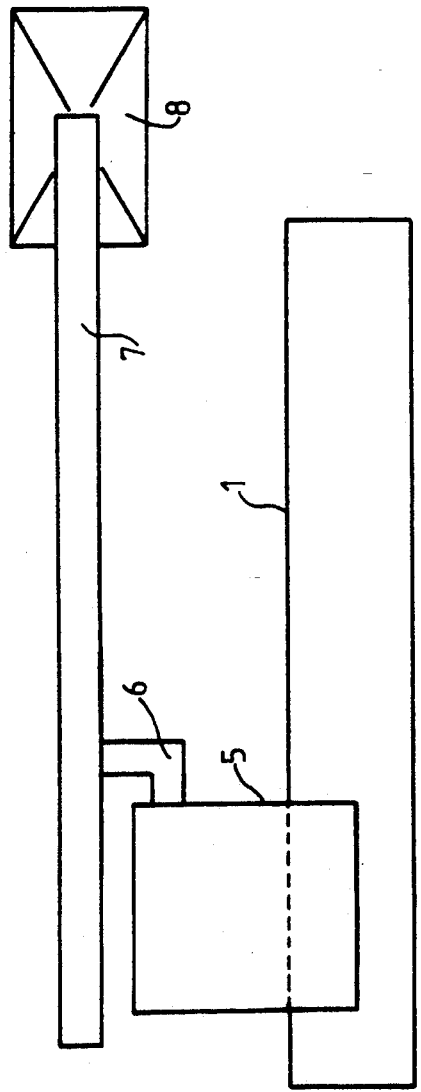
Figure 1B:
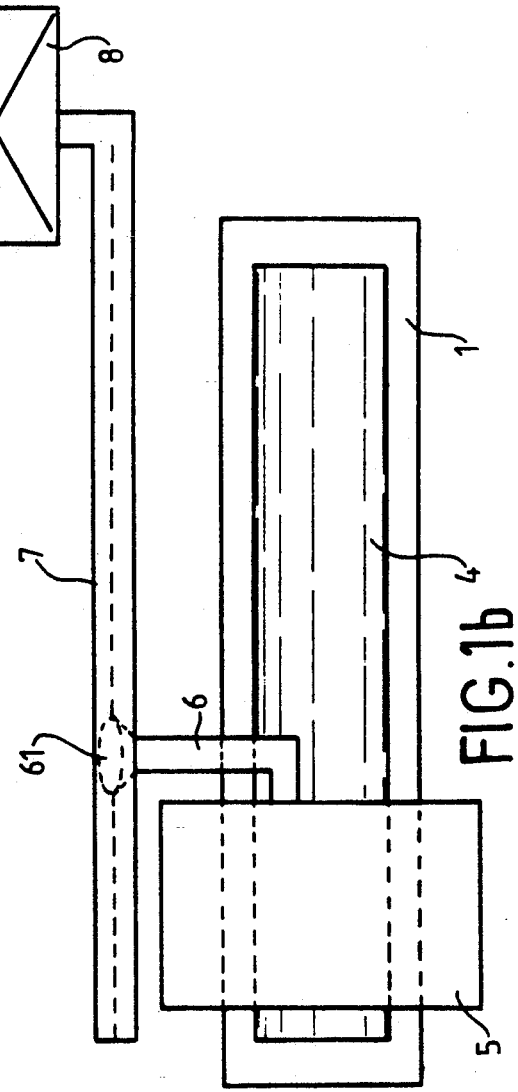
Figure 2:
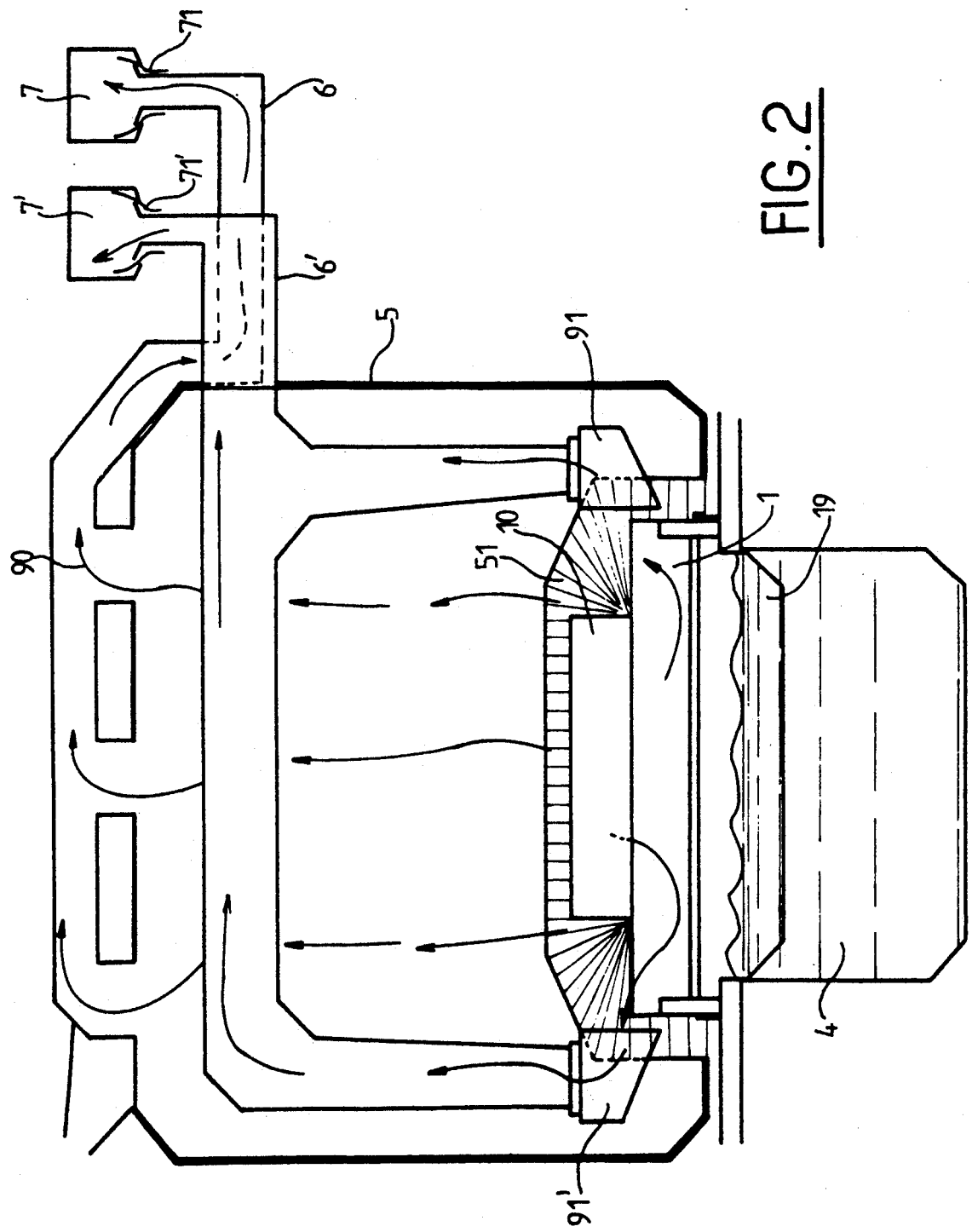
FIG. 2 is a synoptic view of the leaktight container for trapping the smoke.
Figure 3:
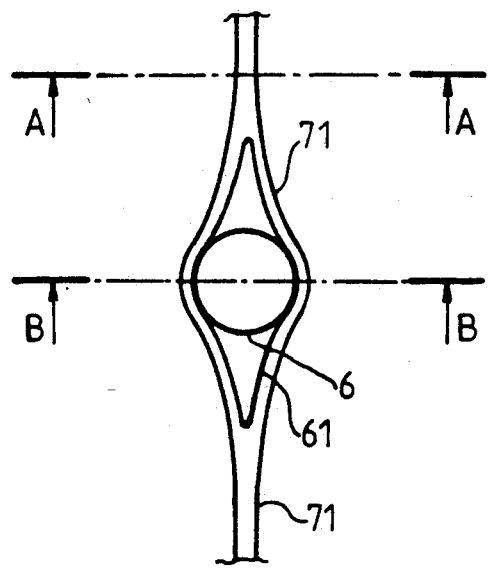
FIG. 3 is a sectional view of the shuttle-shaped section of an exit conduit.
Figure 4A:
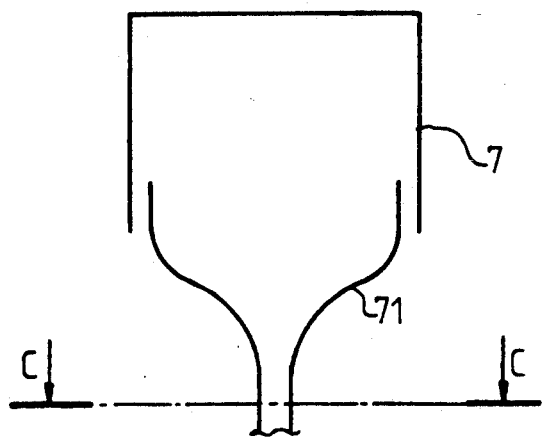
FIGS. 4a and 4b are two sectional views of FIG. 3 which show the fixed suction sheath with its flexible lips.
Figure 4B:
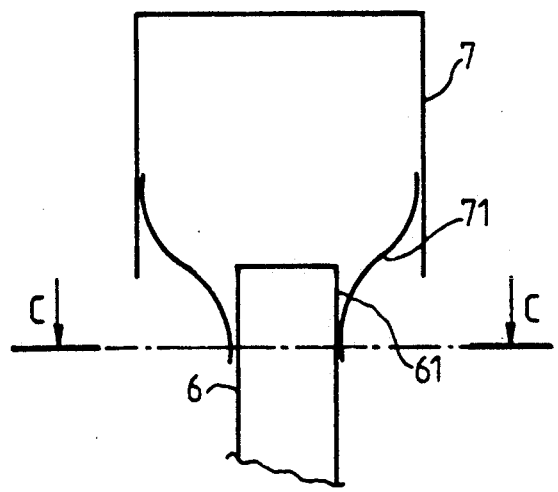
Figure 5:
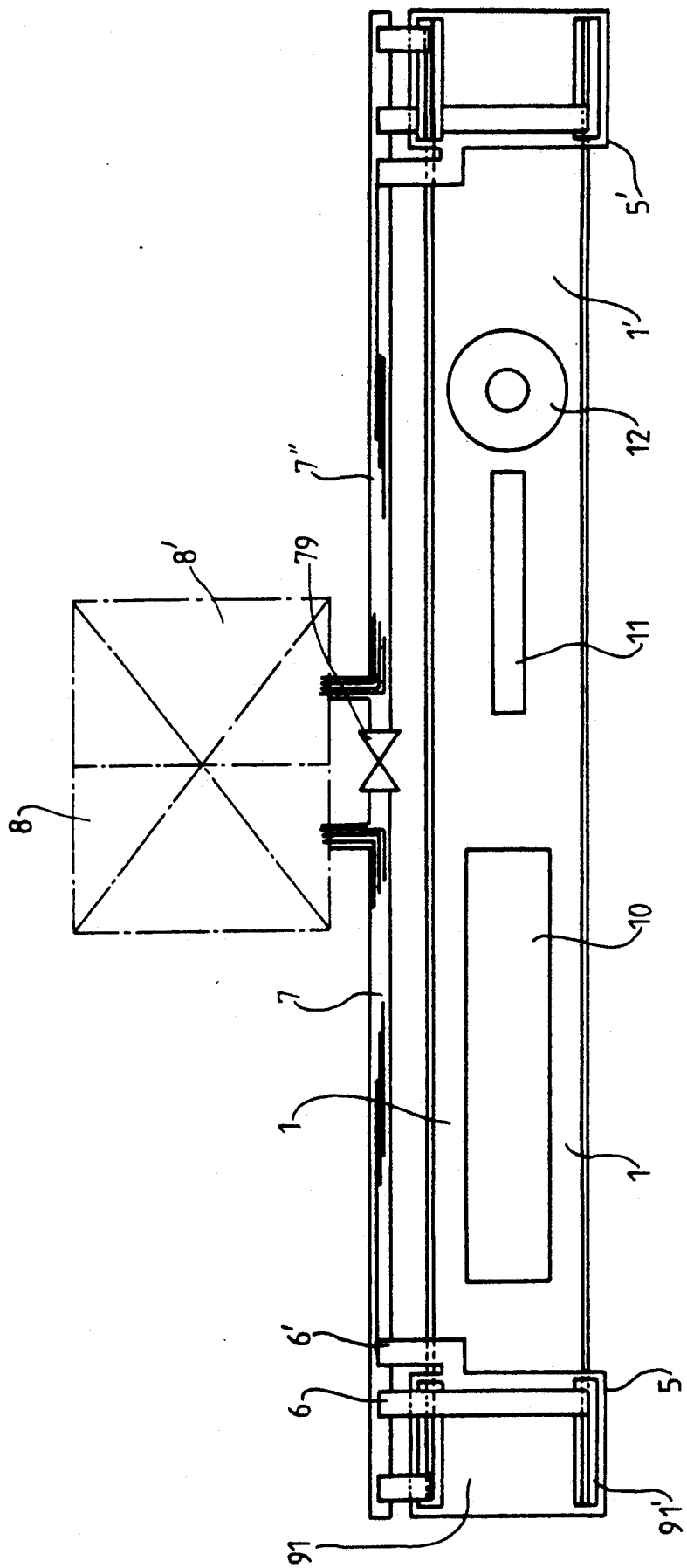
FIG. 5 is a top view of an installation similar to that in FIG. 1b, but comprising two supports.
Figure 6:
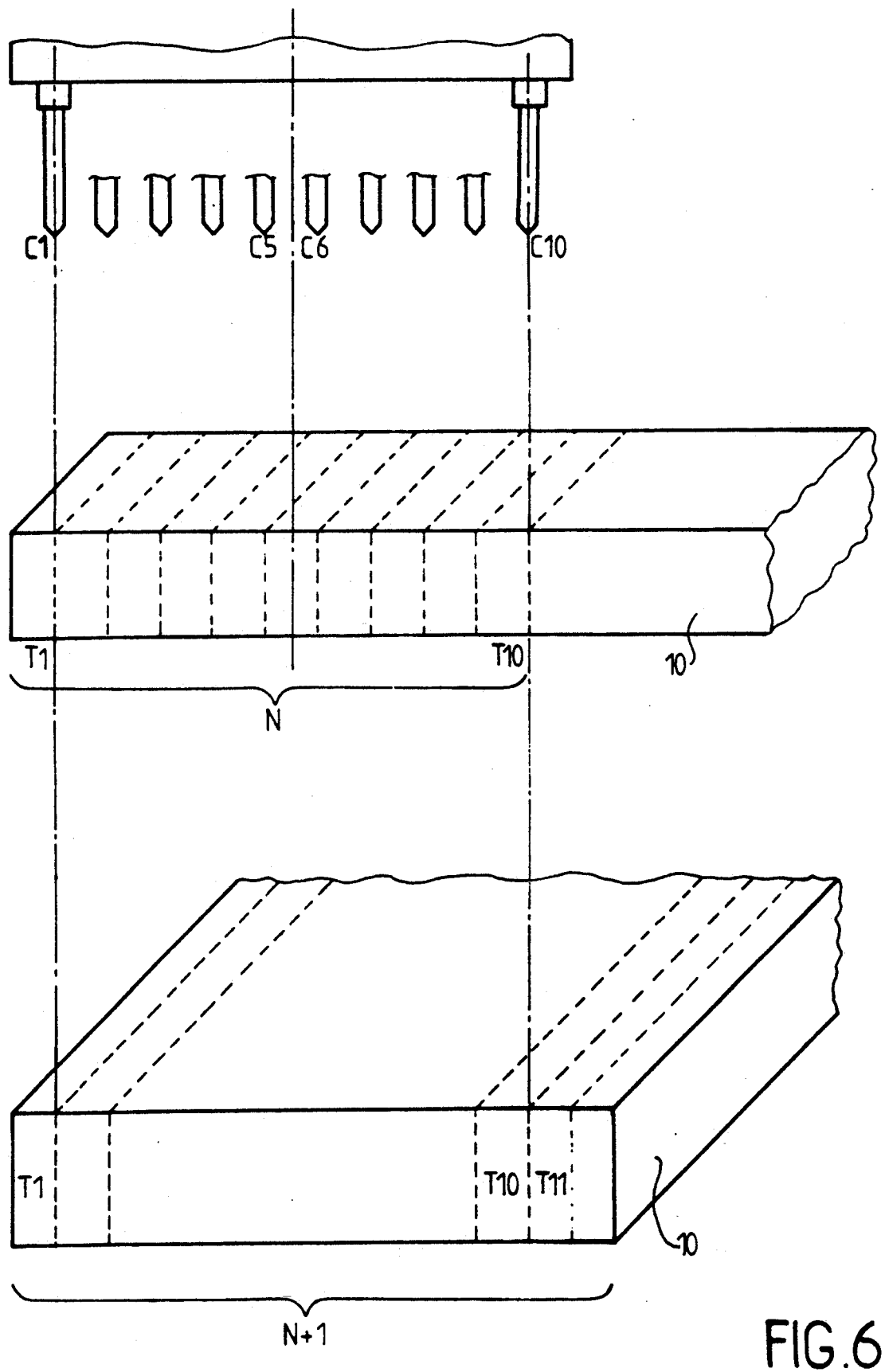
FIG. 6 shows the manner in which a slab can be cut into ten or eleven segments according to whether the operation is performed longitudinally or transversely by virtue of the 90° rotation of the carriage around a vertical axis.
Figure 7A:
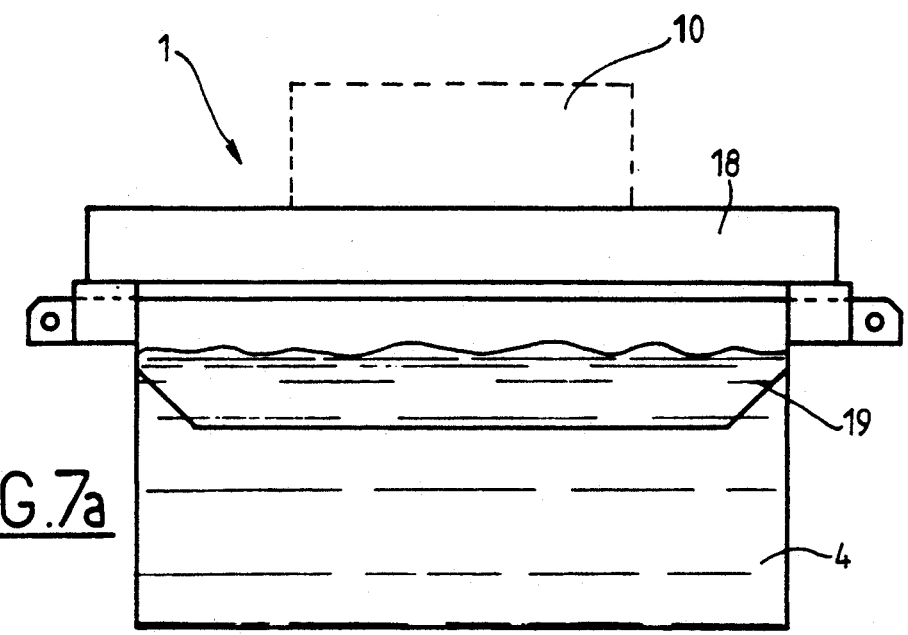
FIG. 7A represents a cutting bench 1 comprising a pit 4 filled with water above which there are disposed flat steel sections 18 disposed edgewise and slantwise as is clearly seen in FIG. 7B in top view; the flat steel sections 18 can be just placed between blocks 17 provided for this purpose over the longitudinal perimeter of the pit 4; the flat steel sections 18 whose size is for example 3500×350×40 mm are disposed in sufficient number to cover the whole of the pit; the flat steel sections 18 constitute the cutting bench on which the scrap iron to be cut is deposited, for example a slab 10 as represented in dashes; beneath the flat steel sections 18 and half submerged in the water of the pit 4, the lateral supporting members 19 are disposed transversely in order channel the suction which is exerted horizontally; the lateral supporting members 19 therefore supplement the leaktight action obtained by the flexible lips 51 represented in FIG. 2, which, it will be noticed, is similar to FIG. 7A, at least in its bottom part; several lateral supporting members 19 are provided in order to interact with the leaktight cabin 5 whatever its location on the rails 3; thus, the cutting bench has holes between the flat steel sections 18 so that the cutting slag can fall into the water and be cooled rapidly therein; obviously, at the time of cutting iron scraps such as the slab 10 represented, the torches will also cut the flat steel sections 18, and it is necessary to adjust the torches so that these flat steel sections are cut only to a depth of a few centimetres on each passage; as a function of this adjustment and of the number of cuttings performed, it is necessary periodically to replace the flat steel sections 18, this operation is obviously facilitated by the fact that the flat steel sections 18 are just placed between the blocks 17, the flat steel sections 18 may be assumed to be of an expendable material; by virtue of the fact that the torches cut into the flat steel sections 18 during each cutting, and also by virtue of the fact that transverse cuts are provided for, it will be understood that it is advantageous to dispose the flat steel sections 18 slantwise on the cutting bench and not perpendicularly, as is the case with the lateral supporting members 19, thus, at the time of transverse cutting, the operator will not have to worry about knowing whether or not one or more of the torches is situated opposite a flat steel section 18; it is clear that, after a certain time of use of this oxygen cutting installation, the slag will accumulate in the pit 4, this is why it is preferable, not only for the flat steel sections 18 to be removable, but also for the lateral supporting members 19, so that cleaning out of the pit 4 is facilitated.
Figure 7B:
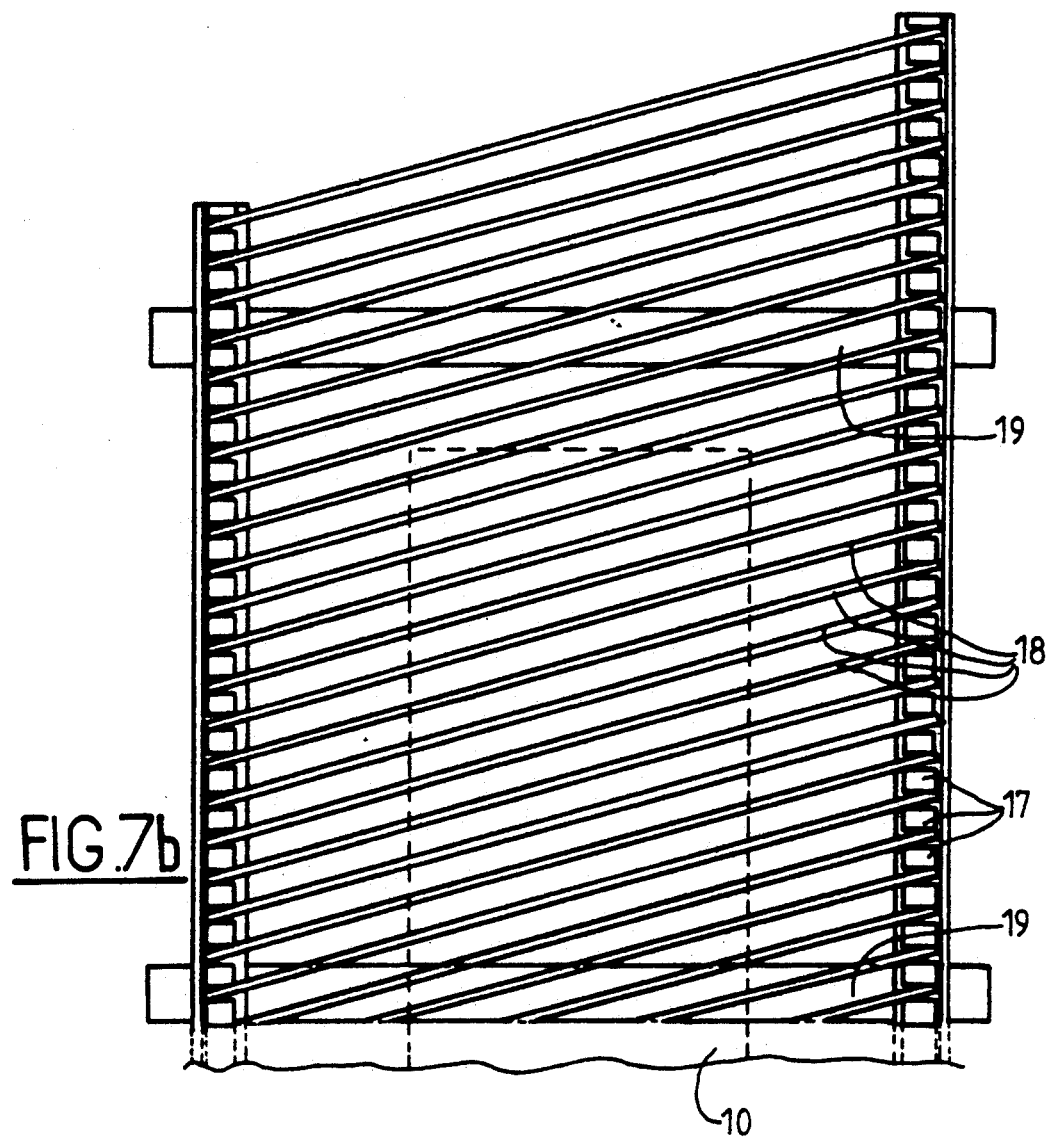
FIG. 7 shows the cutting bench with a profile view 7A and a top view 7B.

Implementation of such an installation for cutting scrap iron by oxygen cutting presents no particular problems; after positioning a piece of scrap iron, for example a slab, on the cutting bench, the operator orders the initial positioning of the torches, that is to say the whole support with its leaktight container, with respect to the slab, the operator then programmes the movement or movements of the torch-carrier carriage with a view to the desired cutting, sets up and performs the adjustment of the suction hoods and of the treatment units for dust removal and denitrification, then orders the execution of the cutting programme. After an initial heating phase, the cutting actually starts and at this moment the cutting slag falls into the water in the pit and the different kinds of smoke are evacuated then treated in the treatment unit. At the end of operation, the programme stops and the operator may now move the support along the cutting bench 1 so that, on the one hand, the cut slab is freed with a view to its handling, and on the other hand, another cutting operation may be initialised.

With such a cutting installation, it is envisaged to treat automatically, that is to say without danger, and with a greatly reduced pollution rate, annual quantities, here given by way of indication, of 25,000 tonnes of salamander, 50,000 tons of slabs and slab scrap, and 10,000 tonnes of various scrap iron by providing two eight-hour shifts per day.

I claim:

1. Installation for cutting scrap iron by oxygen cutting comprising:
   a cutting bench for placing thereon the scrap metal to be cut; a pit in the form of a channel filled with water disposed beneath the cutting bench, which cutting bench comprises holes in order to allow cutting slat to fall directly into the water in the pit; a torch-carrier slat to fall directly into the water in the plurality of torches situated above the scrap metal to be cut, the support being movable on rails disposed parallel to the cutting bench in order to move the torches as the cutting progresses, said torches being completely housed inside said large leaktight container internally provided with a suction hood for evacuating the vapors, brown smoke and dust emitted during the cutting operation, said leaktight container comprising at least two suction hoods, namely, on the one hand, a hood of conventional type disposed above the cutting zone and whose suction is exerted vertically upwards, on the other hand, a suction hood having a longitudinal opening disposed horizontally and parallel to the cutting bench and at the height of the later, and whose suction is exerted horizontally in a direction perpendicular to the cutting bench.

2. Installation for cutting scrap iron by oxygen cutting according to claim 1, wherein the cutting bench comprising holes consists of flat steel sections placed edgewise and slantwise between blocks provided for this purpose over the longitudinal perimeter of the pit.

3. Installation for cutting scrap iron by oxygen cutting according to claim 1, wherein the vapors, brown smoke and dust evacuated by the suction hood are entrained through an exit conduit towards a treatment unit for, on the one hand, dust removal using filters and, on the other hand, denitrification.

4. Installation for cutting scrap iron by oxygen cutting according to claim 1, wherein the torches are disposed aligned with respect to each other and in that this alignment is disposed rotatable through 90 degrees around a vertical axis in order to be disposed either parallel, or perpendicularly to the cutting bench.

5. Installation for cutting scrap iron by oxygen cutting according to claim 4, characterised in that there are ten torches with a spacing between each of them varying from 100 mm to 500 mm.

6. Installation for cutting scrap iron by oxygen cutting according to claim 1, wherein in the pit, partially submerged beneath the flat steel sections, lateral supporting members are provided disposed transversely in order to channel the suction which is exerted horizontally.

7. Installation for cutting scrap iron by oxygen cutting according to claim 1, wherein the evacuation rate of each suction hood is adjustable.

8. Installation for cutting scrap iron by oxygen cutting according to claim 1, wherein the cutting bench is long enough for at least two slabs to be disposed thereon.

9. Installation for cutting scrap iron by oxygen cutting according to claim 1, wherein one torch-carrier is specially arranged in order to carry four torches, which are driven in a so-called cross movement.

10. Installation for cutting scrap iron by oxygen cutting according to claim 1, further including several supports connected to the treatment unit for dust removal and denitrification.

11. Installation for cutting scrap iron by oxygen cutting according to claim 2, wherein the vapors, brown smoke and dust evacuated by the suction hood are entrained through an exit conduit towards a treatment unit for, on the one hand, dust removal using filters and, on the other hand, denitrification.

12. Installation for cutting scrap iron by oxygen cutting according to claim 6, wherein the cutting bench comprising holes consists of flat steel sections placed edgewise and slantwise between blocks provided for this purpose over the longitudinal perimeter of the pit.

13. Installation for cutting scrap iron by oxygen cutting according to claim 7, wherein the cutting bench comprising holes consists of flat steel sections placed edgewise and slantwise between blocks provided for this purpose over the longitudinal perimeter of the pit.

14. Installation for cutting scrap iron by oxygen cutting according to claim 6, wherein the torches are disposed aligned with respect to each other and in that this alignment is disposed rotatable through 90 degrees around a vertical axis in order to be disposed either parallel, or perpendicularly to the cutting bench.

15. Installation for cutting scrap iron by oxygen cutting according to claim 7, wherein the torches are disposed aligned with respect to each other and in that this alignment is disposed rotatable through 90 degrees around a vertical axis in order to be disposed either parallel, or perpendicularly to the cutting bench.

* * * * *

UNITED STATES PATENT AND TRADEMARK OFFICE
CERTIFICATE OF CORRECTION

PATENT NO. : 5,280,883
DATED : January 25, 1994
INVENTOR(S) : Jean-Henri Ibar

It is certified that error appears in the above-identified patent and that said Letters Patent is hereby corrected as shown below:

Claim 1, column 7, line 19, delete "slat to fall directly into the water in the" and insert therefor --support provided with means for carrying a--.

Signed and Sealed this

Twelfth Day of July, 1994

Attest:

BRUCE LEHMAN

Attesting Officer     Commissioner of Patents and Trademarks